(12) United States Patent
Sapija et al.

(10) Patent No.: US 12,313,185 B2
(45) Date of Patent: May 27, 2025

(54) VALVE ASSEMBLY

(71) Applicant: Goodrich Corporation, Charlotte, NC (US)

(72) Inventors: Dariusz Sapija, Siechnice (PL); Agata Kurowska, Kowale (PL)

(73) Assignee: GOODRICH CORPORATION, Charlotte, NC (US)

( * ) Notice: Subject to any disclaimer, the term of this patent is extended or adjusted under 35 U.S.C. 154(b) by 835 days.

(21) Appl. No.: 17/376,210

(22) Filed: Jul. 15, 2021

(65) Prior Publication Data
US 2022/0018459 A1 Jan. 20, 2022

(30) Foreign Application Priority Data

Jul. 17, 2020 (EP) .................................... 20461546

(51) Int. Cl.
*F16K 37/00* (2006.01)

(52) U.S. Cl.
CPC ...... *F16K 37/0008* (2013.01); *F16K 37/0041* (2013.01); *F16K 37/0058* (2013.01); *F16K 37/0066* (2013.01)

(58) Field of Classification Search
CPC ............. F16K 37/0008; F16K 37/0041; F16K 37/0058; F16K 37/0066; F16K 5/06; F16K 37/0083
See application file for complete search history.

(56) References Cited

U.S. PATENT DOCUMENTS

| 450,451 | A | * | 4/1891 | Ferrell | ............... F16K 37/0008 137/553 |
| 467,796 | A | * | 1/1892 | Ferrell | ............... F16K 37/0008 137/553 |
| 721,821 | A | * | 3/1903 | Myers | ................. F16K 37/0008 137/556 |
| 2,768,604 | A | * | 10/1956 | Enerud | ............... F16K 37/0008 137/553 |
| 4,143,995 | A | | 3/1979 | Divisi | |
| 6,237,626 | B1 | * | 5/2001 | Wilkins | ............. F16K 37/0008 251/248 |
| 7,114,510 | B2 | * | 10/2006 | Peters | ..................... F16K 31/60 137/1 |
| 10,088,851 | B2 | | 10/2018 | Huck et al. | |
| 11,255,462 | B2 | * | 2/2022 | Bushman | ............ F16K 37/0008 |
| 11,530,760 | B2 | * | 12/2022 | Kwiatkowski | ...... F16K 37/0083 |

(Continued)

FOREIGN PATENT DOCUMENTS

| EP | 1356228 A2 | 10/2003 |
| GB | 1509413 A | 5/1978 |

(Continued)

OTHER PUBLICATIONS

Extended European Search Report for International Application No. 20461546.2 dated Dec. 7, 2020, 8 pages.

*Primary Examiner* — Yaritza Guadalupe-McCall
(74) *Attorney, Agent, or Firm* — CANTOR COLBURN LLP

(57) ABSTRACT

A valve assembly has a housing and a valve shaft rotatable in the housing. A sensor assembly detects the position of the valve shaft. The sensor assembly has an indicator on the housing; and a position sensor on the valve shaft configured to detect a feature of the indicator to determine the position of the valve shaft.

8 Claims, 9 Drawing Sheets

(56) References Cited

U.S. PATENT DOCUMENTS

| | | | |
|---|---|---|---|
| 11,549,610 B2* | 1/2023 | Bushman | F16K 37/0033 |
| 11,796,079 B2* | 10/2023 | Kroczek | F16K 5/0605 |
| 12,060,052 B2* | 8/2024 | Georgin | B60T 8/94 |
| 2009/0322359 A1* | 12/2009 | Rho | F16K 37/0041 |
| | | | 324/714 |
| 2011/0042593 A1* | 2/2011 | Wilby | F16K 31/042 |
| | | | 73/862.08 |
| 2015/0260310 A1* | 9/2015 | Bahalul | F16K 37/0041 |
| | | | 137/557 |
| 2022/0018459 A1* | 1/2022 | Sapija | F16K 37/0083 |
| 2022/0228674 A1* | 7/2022 | Mukhlifi | F16K 3/30 |
| 2022/0412208 A1* | 12/2022 | Duncan | F16K 3/02 |

FOREIGN PATENT DOCUMENTS

| | | | | |
|---|---|---|---|---|
| WO | 0240914 A2 | 5/2002 | | |
| WO | WO-2010090797 A1 * | 8/2010 | | F16K 3/0254 |
| WO | WO-2020118253 A1 * | 6/2020 | | F16K 37/0008 |

* cited by examiner

VALVE ASSEMBLY

CROSS-REFERENCE TO RELATED APPLICATIONS

This application claims priority to European Patent Application No. 20461546.2 filed Jul. 17, 2020, the entire contents of which is incorporated herein by reference.

TECHNICAL FIELD

The following description relates to a valve assembly. The following description also relates to a method of determining a position of a valve assembly.

BACKGROUND

Motorized valves are used in aircraft hydraulic systems to control the flow of fluid. Some such motorized valves include a rotary valve shaft. It is known to determine the operating condition of the motorized valve by determining the position of the rotatable valve shaft.

To determine the operating condition of the valve, a position sensor on a housing of a valve assembly is used to detect a feature on the valve shaft to determine the position of the shaft. The position sensor communicates and is provided power through wires connected to other modules in or on the housing. Such position sensors include microswitches. One problem with a sensor monitoring a feature of the shaft is that the number of positions of the shaft that may be determined is limited.

BRIEF DESCRIPTION

According to an aspect, there is provided a valve assembly comprising: a housing; a valve shaft rotatable in the housing; and a sensor assembly for detecting the position of the valve shaft; wherein the sensor assembly comprises: an indicator on the housing; and a position sensor on the valve shaft configured to detect a feature of the indicator to determine the position of the valve shaft.

The valve assembly may be a hydraulic valve assembly.

The position may be an angular position.

The indicator may extend annularly about the shaft.

The indicator may comprise an annularly extending surface spaced from the shaft, wherein the surface defines the feature configured to be detected by the position sensor. The feature may be an indent in the surface. The feature may be a protrusion on the surface. The feature may be one of a plurality of features. The features may be disposed annularly around the annularly extending surface. At least one feature may differ from at least one other feature. The at least one feature may differ in annular length from the at least one other feature.

The indicator may comprise a cam. The annularly extending surface may be a cam surface. The annularly extending surface may be an inwardly facing surface.

The position sensor may comprise a contact sensor.

The contact sensor may comprise a microswitch.

The position sensor may comprise at least one of an ultrasonic sensor, a hall sensor, and an IR proximity reflective sensor.

The indicator may comprise at least a first surface section and a second surface section. The position sensor on the valve shaft may be configured to remotely detect the difference between the first surface section and a second surface section to determine the position of the valve shaft.

The position sensor may be in the valve shaft.

The valve shaft may comprise a first portion and a second portion. The position sensor may be between the first and second portions.

The first and second portions may be spaced by a spacer.

The indicator may be removable from the housing.

The indicator may be a ring. The indicator may be a cam ring.

The valve assembly may comprise a key configured to orientate the indicator in the housing.

The key may comprise a protrusion on one of the indicator and the housing and a recess on the other of the indicator and the housing.

The position sensor may be a first position sensor. The sensor assembly may comprise a second position sensor.

The indicator may comprise a first indicator part and a second indicator part, wherein the first position sensor may be configured to detect the first indicator part and the second position sensor may be configured to detect the second indicator part.

The valve assembly may comprise a transfer arrangement configured to transfer at least one of power and a communication signal. The transfer arrangement may comprise a first transfer module rotatable with the valve shaft, and a second transfer module on the housing wherein the first and second transfer modules communicate to transfer the at least one of power and a communication signal The first transfer module may comprise a wireless power receiving module, and the second transfer module may comprise a wireless power transmitting module.

At least one of the wireless power receiving module and the wireless power transmitting module may comprise an induction coil.

The first transfer module may comprise a wireless data receiving module, and the second transfer module may comprise a wireless data transmitting module.

The housing may define a sealed chamber and the position sensor may be in the sealed chamber. The sealed chamber may be a hermetically sealed chamber.

The first transfer module may be in the sealed chamber and the second transfer module may be external to the sealed chamber.

According to an aspect there is provided a sensor assembly for indicating the position of a valve shaft of a valve assembly, the sensor assembly comprising: a position sensor mountable on a valve shaft; and an indicator mountable on a housing to extend annularly about the valve shaft; wherein the position sensor is configured to rotate with the valve shaft and detect a feature of the indicator to determine the position of the valve shaft.

The position sensor may comprise a contact sensor. The indicator may comprise a cam.

According to an aspect, there is provided a valve assembly comprising: a housing; a valve shaft rotatable in the housing; and a transfer arrangement configured to transfer at least one of power and a communication signal, comprising a first transfer module rotatable with the valve shaft, and a second transfer module on the housing wherein the first and second transfer modules communicate to transfer the at least one of power and a communication signal.

According to an aspect there is provided a method of determining an angular position of a rotatable valve shaft of a valve assembly, the method comprising: rotating a position sensor with the valve shaft, and determining the angular position of the valve shaft by detecting a feature of an indicator on a housing of the valve assembly.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features and advantages of the disclosure are apparent from the following detailed description taken in conjunction with the accompanying drawings in which:

DETAILED DESCRIPTION

Figure 1:
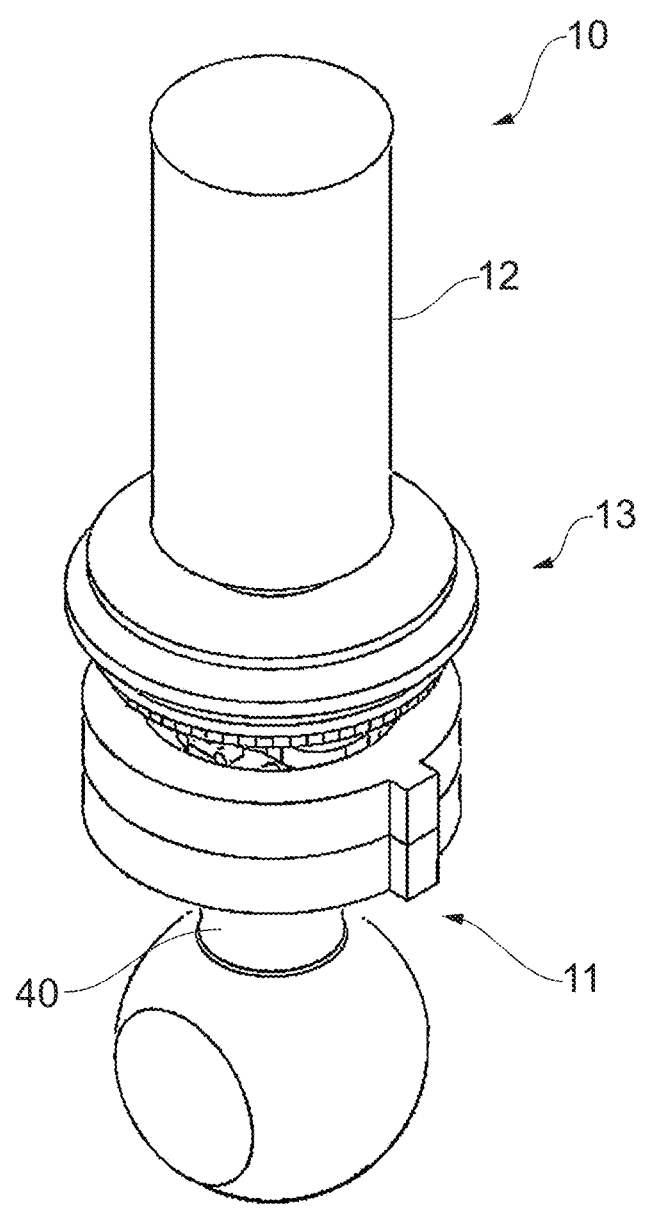
FIG. 1 is a schematic side view of a valve assembly.
Figure 2:
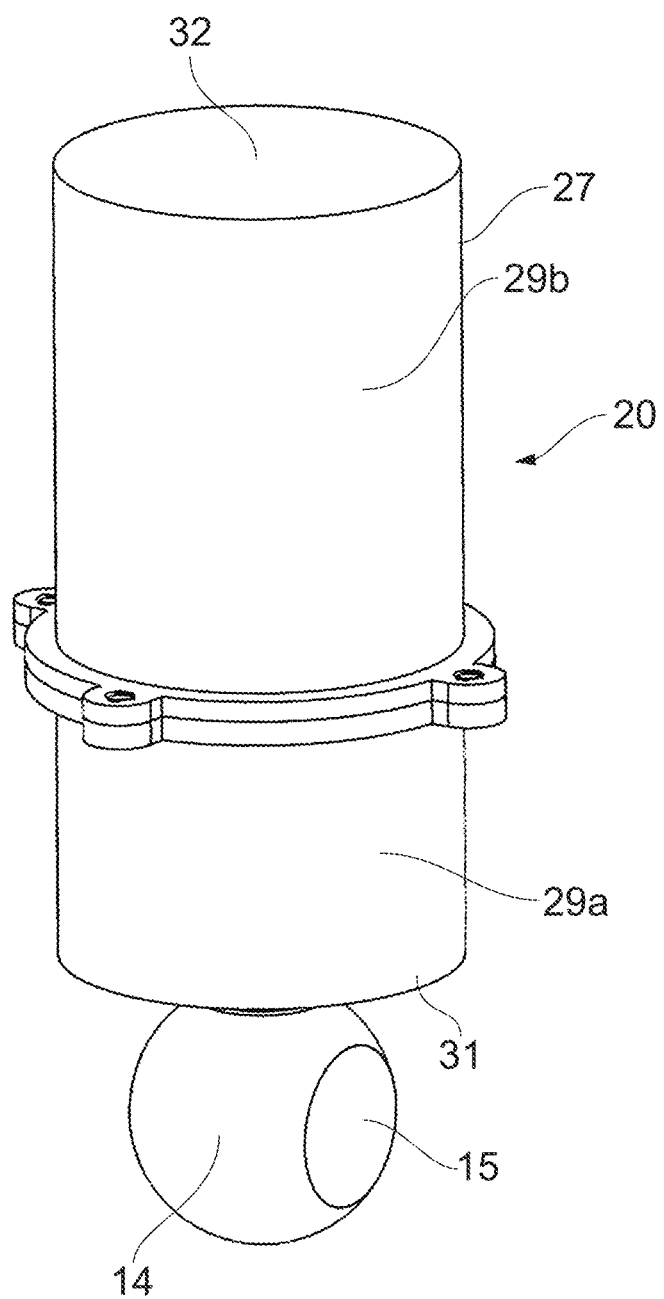
FIG. 2 is a schematic side view of a housing of the valve assembly.
Figure 3:
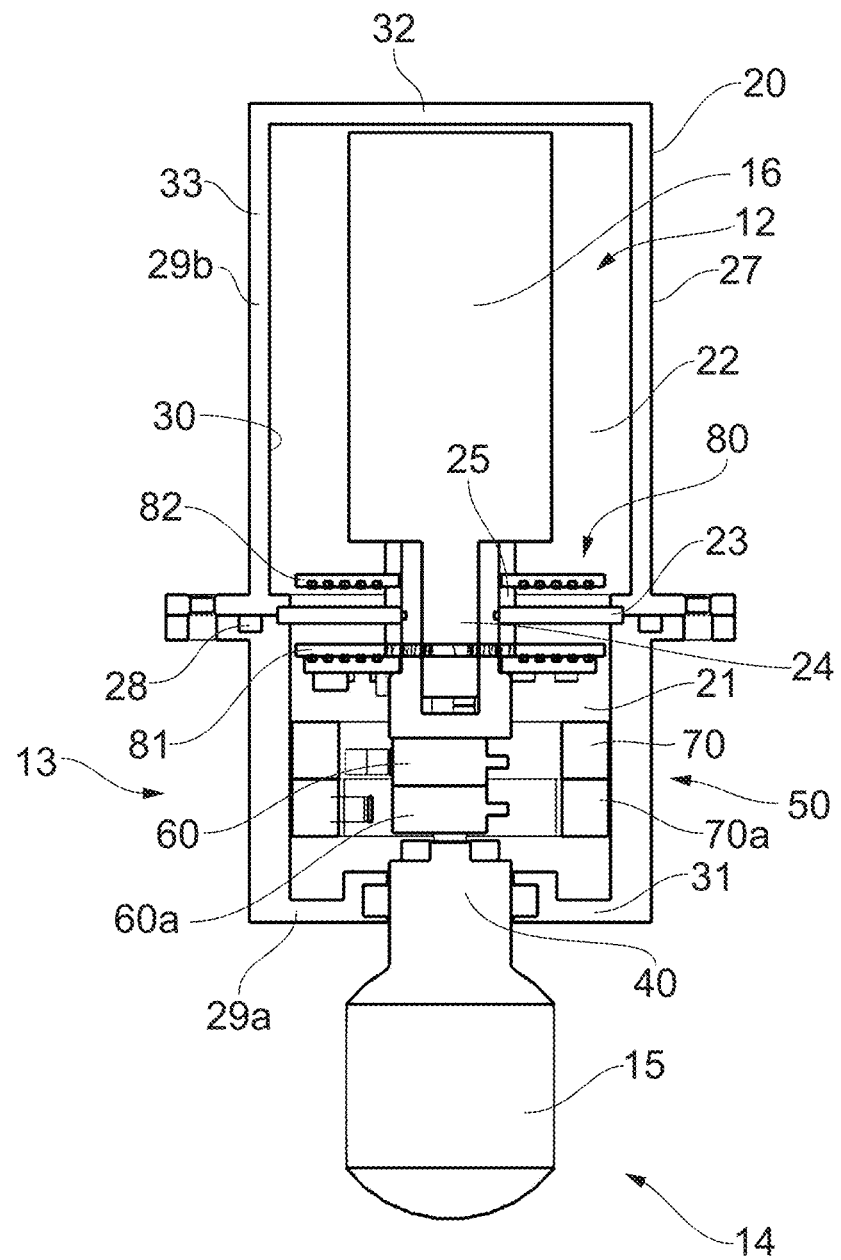
FIG. 3 is a cross-sectional schematic side view of the valve assembly.

With combined reference to the Figures, a hydraulic valve assembly 10 is described below. The hydraulic valve assembly 10 is shown in FIGS. 1 to 4 including a valve arrangement 11, a drive arrangement 12 and a monitoring arrangement 13. The hydraulic valve assembly has a housing 20 as shown in FIGS. 2 and 3. The valve arrangement 11 has a valve shaft 40. The valve shaft 40 extends from the housing 20. The valve arrangement 11 has a valve head 14 with a flow path 15 formed through the valve head 14. The valve head 14 is ball shaped in the shown embodiment but the shape of the valve head 14 can differ. The housing 20 forms part of a housing assembly including a head housing portion (not shown) for the valve head 14. The head housing portion may be formed with or separable from the housing 20. The valve head 14 is received in a chamber (not shown) and is rotatable with respect to a fluid inlet and a fluid outlet (not shown) to move the valve assembly 10 between different operating flow conditions, for example an open flow condition and a closed flow condition. Operation of such a valve is known and features of the valve arrangement are omitted from the Figures. Although the valve assembly described herein is a hydraulic valve assembly, other valve assemblies are envisaged.

Figure 4:
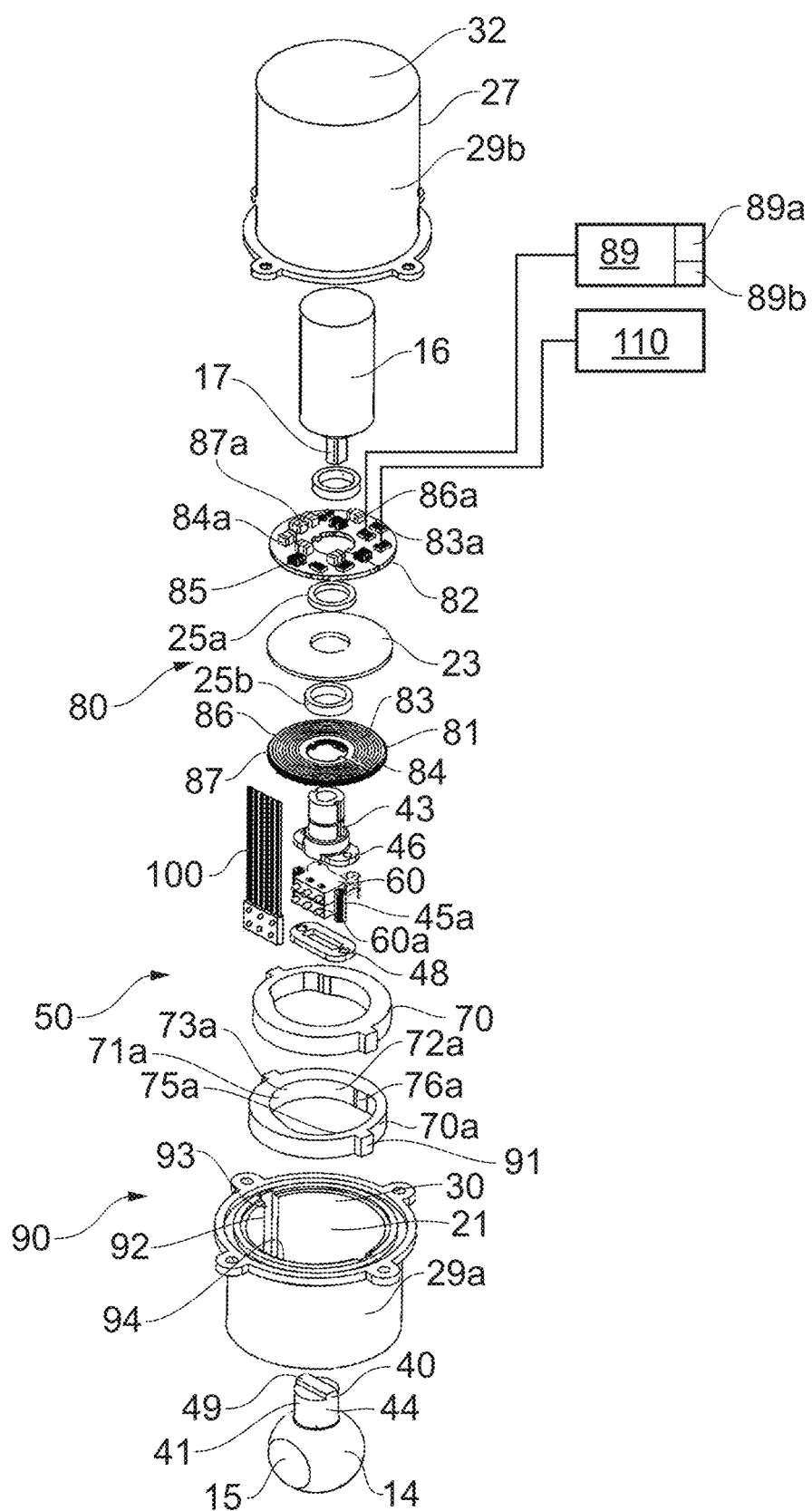
FIG. 4 is an exploded schematic side view of the valve assembly.

As shown in FIGS. 3 & 4, the drive arrangement 12 includes a motor 16, acting as a valve drive means, and the rotatable valve shaft 40. The shaft 40 communicates between the motor 16 and the valve head 14. The shaft 40 is fixed with the valve head 14 such that rotation of the shaft 40 about its longitudinal axis actuates the valve head 14. The shaft 40 and valve head 14 are integrally formed in the present embodiment.

The shaft 40 extends in an axial direction in the housing 20. The motor 16 is at a first end of the shaft 40. The valve head 14 is at a second end of the shaft 40. The motor 16 is in the housing 20. The shaft 40 extends through the housing 20 at one end.

The monitoring arrangement 13 has a sensor assembly 50 and a transfer arrangement 80. The transfer arrangement 80 is configured to provide power to the sensor assembly 50. The transfer arrangement 80 is configured to communicate signals from the sensor assembly 50 to a controller 89. In embodiments, the transfer arrangement 80 may provide at least one of providing power to the sensor assembly 50 and communicating signals from the sensor assembly 50

As shown in FIG. 3, the housing 20 defines a first chamber 21 and a second chamber 22. The housing 20 comprises an outer shell 27. The sensor assembly 50 is in the first chamber 21. The motor 16 is in the second chamber 22. A barrier 23 separates the first and second chambers 21, 22. The shaft 40 extends through the barrier 23. The barrier 23 forms a wall. A shaft bore 24 extends through the barrier 23. An inner seal 25 fluidly seals the barrier 23 with the shaft 40. The inner seal 25 comprises first and second seal elements 25a, 25b. An outer seal 28 fluidly seals the barrier 23 with the outer shell 27. As such, the first and second chambers 21, 22 are isolated from each other. The first chamber 21 is sealed from external to the housing 20. A fluid seal is formed. In embodiments, the forming of a fluid seal by the o-rings is aided by an adhesive, for example epoxy or glue. In embodiments the fluid seal is a hermetic seal. In an embodiment, the first and second chambers 21, 22 are fluidly isolated. In embodiments, the barrier 23 is omitted.

The housing 20 comprises first and second housing portions 29a, 29b. The housing portions 29a, 29b form the outer shell 27. Each housing portion 29a, 29b has a cup arrangement which form the outer shell 27 when brought together at their open ends. The housing configuration may differ. A fastener arrangement (not shown) releasably mounts the housing portions 29a, 29b with each other. In embodiments, the housing portions 29a, 29b can be threadingly engaged. In the shown embodiment, the housing is cylindrical, although the shape of the housing may differ.

The housing 20 has an inner surface 30. The inner surface 30 forms the peripheral wall of the first chamber 21. The inner surface 30 is a circumferentially extending surface in the present arrangement. The inner surface 30 is formed by an annular wall 33. The housing 20 has end walls 31, 32. The shaft 40 extends through an opening in one of the end walls 31.

The motor 16 of the hydraulic valve assembly 10 is engaged with the rotatable valve shaft 40. A coupling 17 couples the shaft 40 with the motor 16. The motor 16 is configured to drive rotation of the rotatable valve shaft 40. The motor 16 is an electric motor, however it can be appreciated that any motor 16 capable of rotating the shaft 40 could be used. In the shown embodiment the motor 16 is disposed within the housing 20 however, the motor 16 could be disposed external to the housing 20. In such an embodiment, the housing 20 may have a single chamber.

The sensor assembly 50 is disposed in the housing 20. The transfer arrangement 80 is disposed in the housing 20. A first transfer module 81 of the transfer arrangement 80 is on the shaft 40. A second transfer module 82 of the transfer arrangement 81 is fixed with the housing 20. In the present embodiment, the first module 81 is in the first chamber 21 and the second module 82 is in the second chamber 22.

The sensor assembly 50 will now be described in detail with reference to FIGS. 4 to 6. The sensor assembly 50 comprises a first sensor configuration 51 and a second sensor configuration 52. The number of sensor configurations may vary, and in one configuration is a single sensor configuration. Each sensor configuration 51, 52 is configured to detect an angular position of the shaft 40 in the housing 20.

The first sensor configuration 51 comprises a first position sensor 60 and a first indicator 70. The second sensor configuration 52 comprises a second position sensor 60a and a second indicator 70a. The first and second sensor configurations 51, 52 are axially arranged. An exploded view is shown in FIG. 4, which includes the sensor assembly 50 shown in FIG. 5, along with part of the shaft as well as other features omitted in FIG. 5. A cross sectional view of FIG. 5 is shown in FIG. 6.

The first position sensor 60 is configured to detect its orientation with respect to the first indicator 70. The first position sensor 60 is a contact sensor. That is, the first position sensor 60 contacts against another feature to determine its position. In embodiments, the first position sensor 60 is a non-contact sensor, such as an optical sensor as will be described below. In the present embodiment the first position sensor 60 is a microswitch. The first position sensor 60 is located on the rotatable valve shaft 40. The first position sensor 60 rotates with the rotatable valve shaft 40. The first indicator 70 is fixedly mounted with the housing 20.

The first position sensor 60 comprises a body 62 and a contact element 61. The contact element 61 is a movable sensor arm. The sensor arm protrudes from the body 62. The contact element 61 extends substantially radially with a free end 63 contactable with the first indicator 70. The contact element 61 is biased radially outwardly. That is the contact element is biased against the first indicator 70. The movable sensor arm is pivotable. Movement of the contact element actuates a switch (not shown). The first position sensor 60 rotates with the shaft. In the present arrangement, the first position sensor 60 is in the valve shaft 40 (as shown in FIG. 6). Disposing the first position sensor 60 in the shaft 40 helps to provide a compact valve assembly. In embodiments, the first position sensor 60 protrudes, at least partially, from an outer side 41 of the valve shaft 40 and may be on the outer side 41 of the valve shaft 40. The contact element 61 is movable between an extended position (as shown in FIG. 7A) and a retracted position (as shown in FIG. 7B). In the extended position the free end 63 is disposed at a greater radial distance from the rotational axis of the shaft 40 than in the retracted position. In embodiments, the contact element 61 is operable in a plurality of positions and the first position sensor 60 is configured to detect the plurality of different positions.

Figure 5:
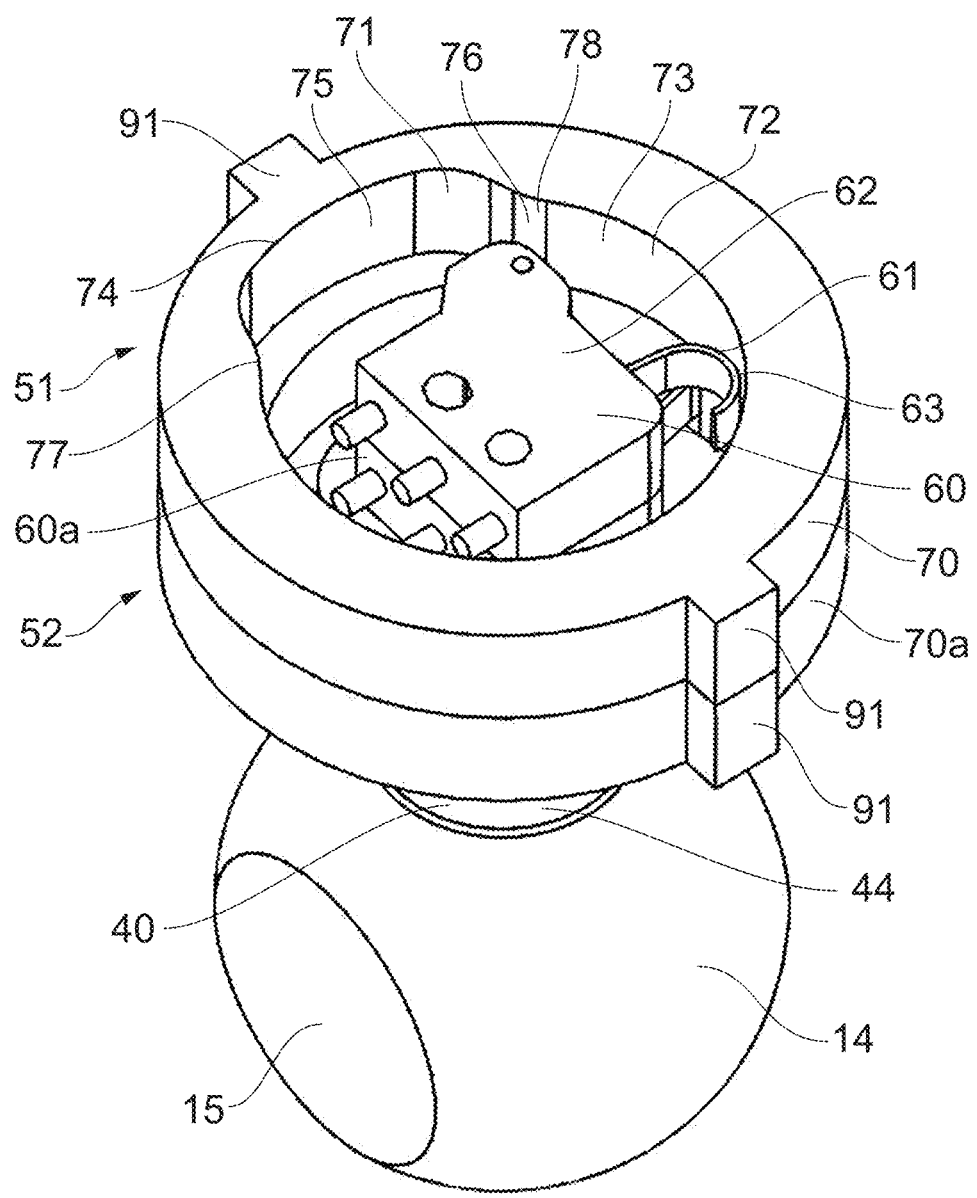
FIG. 5 is a schematic view of a sensor assembly of the valve assembly.

Referring in particular to FIG. 5, the first indicator 70 of the first sensor configuration 51 comprises a first cam 71. The first cam 71 interacts with the first position sensor 60. The first cam 71 guides the contact element 61. The first cam 71 has a cam surface. The cam surface is formed by an inner surface 72 of the first indicator 70, although alternative surfaces may form the cam surface. The first cam 71 forms a cam ring. The first indicator 70 extends annularly around the shaft 40. The first indicator 70 is arranged in the housing 20 to extend annularly around the first position sensor 60.

The first indicator 70 is mounted in the housing 20. The first indicator 70 is fixedly mounted in the housing 20. The first indicator 70, in embodiments, is integrally formed with the housing 20. In the present embodiment, the first indicator 70 is removable from the housing 20 as is shown in FIG. 4. As such, the first indicator 70 is interchangeable and may be replaced by a different first indicator 70, for example one with a different cam shape. By changing indicators, it is possible to adjust or change the positions of the valve shaft 40 that can be detected by a sensor configuration. The capacity to replace an indicator with a new indicator with a different shape allows the functionality of the valve assembly to change without the need to replace the whole system.

The first indicator 70 is axially aligned with the first position sensor 60. As such, the position sensor 60 is configured to detect its angular orientation with respect to the first cam 71. The first cam 71 is spaced from the shaft 40. The shaft 40 rotates in the first cam 71. The inner surface 72 is spaced from the shaft by an annular gap. The first position sensor 60 contacts the inner surface 72. When the shaft 40 rotates, the contact element 61 slides along the cam surface. The radial distance of the cam surface varies along its circumferential length. That is, the radial distance from the rotational axis of the shaft 40 to the cam surface varies in an annular direction.

The inner surface 72 has a first surface section 73. The first surface section 73 is spaced from the rotational axis of the valve shaft 40 by a first radial distance R1 (as shown in FIG. 7B). The inner surface 72 has a recess 74. The recess 74 is in the first surface section 73. The recess 74 defines a second surface section 75. The second surface section 75 is spaced from the valve shaft 40 by a second radial distance R2 (as shown in FIG. 7B). The second radial distance R2 is greater than the first radial distance R1. In embodiments, the second surface section 75 is a protrusion. In such an arrangement, second radial distance R2 is less than the first radial distance R1.

A transition portion 76 is provided at each juncture 77 of the first surface section 73 and the second surface section 75. The transition portion 76 has a connecting surface 78 which provides a transition between the first and second surface sections. The connecting surface 78 is angled with respect to each of the first and second surface sections 73, 75. The connecting surface 78 has an arcuate profile, but may be linear, or partially linear. The connecting surface 78 at each juncture 77 provides a smooth transition for the contact element 61 moving between the first and second surface sections 73, 75. In other embodiments, the cam can have a different number of surface sections. In an embodiment with more than two surface sections, each surface section may differ in radial distance from the central axis, or two surface sections may be separated by an intermediate surface section having a different radial distance.

With reference in particular to FIGS. 4, 7A and 7B, the second position sensor 60a is configured to detect its orientation with respect to the second indicator 70a. The second position sensor 60a is a contact sensor 61a. That is, the second position sensor 60a contacts against another feature to determine its position. In embodiments, the second position sensor 60a is a non-contact sensor, such as an optical sensor as will be described below. In the present embodiment the second position sensor 60 is a microswitch. The second position sensor 60a is substantially the same as the first position sensor 60, as described above, in the present embodiment, and so a detailed description will be omitted. The second position sensor 60a is located on the rotatable valve shaft 40. The second position sensor 60a rotates with the rotatable valve shaft 40. The first and second position sensors 60, 60a are provided in a stacked configuration.

Referring to FIG. 4, the second indicator 70a of the second sensor configuration 52 comprises a second cam 71a. The second cam 71a interacts with the second position sensor 60a. The second cam 71a guides the contact element 61a of the second position sensor 60a. The second cam 71a has a cam surface. The cam surface is formed by an inner surface 72a of the second indicator 70a, although alternative surfaces may form the cam surface. The second cam 71a forms a cam ring. The second indicator 70a extends annularly around the shaft 40. The second indicator 70a is arranged in the housing 20 to extend annularly around the second position sensor 60a.

The second indicator 70a is mounted in the housing 20. The second indicator 70a is fixedly mounted in the housing 20. The second indicator 70a, in embodiments, is integrally formed with the housing 20. In the present embodiment, the second indicator 70a is removable from the housing 20. As such, the second indicator 70a is interchangeable and may be replaced by a different second indicator 70a, for example one with a different cam shape.

The second indicator 70a is axially aligned with the second position sensor 60a. As such, the second position sensor 60a is configured to detect its angular orientation with respect to the second cam 71a. The second cam 71a is spaced from the shaft 40. The shaft 40 rotates in the second cam 71a. The inner surface 72a is spaced from the shaft by an annular gap. The second position sensor 60a contacts the inner surface 72a. When the shaft 40 rotates, the contact element 61a slides along the cam surface. The radial distance of the cam surface varies along its circumferential length. That is, the radial distance from the rotational axis of the shaft 40 to the cam surface varies in an annular direction.

The inner surface 72a has a first surface section 73a. The first surface section 73a is spaced from the rotational axis of the valve shaft 40 by a first radial distance. The inner surface 72a has a recess. The recess is in the first surface section 73a. The recess defines a second surface section 75a. The second surface section 75a is spaced from the valve shaft 40 by a second radial distance. The second radial distance is greater than the first radial distance. In embodiments, the second surface section 75a is a protrusion. In such an arrangement, second radial distance is less than the first radial distance. It can be appreciated that the radial distances can be equal to the radial distances R1 and R2 respectively, or different from R1 and R2, with another feature distinguishing the first and second surface sections.

A transition portion 76a is provided at each juncture of the first surface section 73a and the second surface section 75a. The transition portion 76a has a connecting surface which provides a transition between the first and second surface sections. The connecting surface is angled with respect to each of the first and second surface sections 73a, 75a. The connecting surface has an arcuate profile, but may be linear, or partially linear. The connecting surface at each juncture provides a smooth transition for the contact element 61a moving between the first and second surface sections 73a, 75a. In other embodiments, the cam can have a different number of surface sections. In an embodiment with more than two surface sections, each surface section may differ in radial distance from the central axis, or two surface sections may be separated by an intermediate surface section having a different radial distance.

The second sensor configuration 52 is configured to detect a different position of the valve shaft 40 to the first sensor configuration 51. The second cam 71a of the second sensor configuration 52 is offset with respect to the first cam 71 of the first sensor configuration 51. The second indictor 70a is disposed in the housing 20 at an angular offset of 90 degrees. That is, the second cam 71a of the second indicator 70a is rotated about the central axis by 90 degrees to the first cam 71 of the first indicator 70. The second surface sections 75, 75a of the first and second indicators 70, 70a are therefore offset from each other. The first and second position sensors 60, 60a contact the respective second surface sections 75, 75a of the first and second indicators 70, 70a at different rotational positions of the shaft 40. The first and second position sensors 60, 60a are able to determine different angular positions of the shaft 40, for example the position of the shaft 40 when the valve is in an open flow condition and the position of the shaft when the valve is in a closed flow condition. With such an arrangement it is possible to positively determine the position of the shaft 40, and therefore the valve 40 in both open and closed flow conditions. It will be understood that although the angular offset is shown to be 90 degrees that other offsets are possible.

In embodiments the first and second indicators 70, 70a are aligned with each other, or a single indicator is used with a common cam surface, and the position sensors 60, 60a are angularly offset from each other, for example at 90 degrees. In another embodiment, the first and second indicators 70, 70a are aligned on the housing and the first and second position sensors 60, 60a are aligned on the shaft 40, and the multiple position sensors are used for redundancy.

The first and second indicators 70, 70a are provided in a stacked configuration. The first indicator 70 is stacked on the second indicator 70a.

With reference in particular to FIG. 5, the shaft 40 comprises a first valve shaft portion 43 and a second valve shaft portion 44. The first and second position sensors 60, 60a are disposed between the first valve shaft portion 43 and the second valve shaft portion 44. The first and second shaft portions 43, 44 are axially aligned. The position sensors 60, 60a are in the rotatable valve shaft 40. The first valve shaft portion 43, second valve shaft portion 44, and the position sensors 60, 60a are connected and configured to rotate together. It can be appreciated that any number of valve shaft portions can be used. For example, an intermediate shaft portion may be disposed between the two position sensors 60, 60a.

Figure 6:
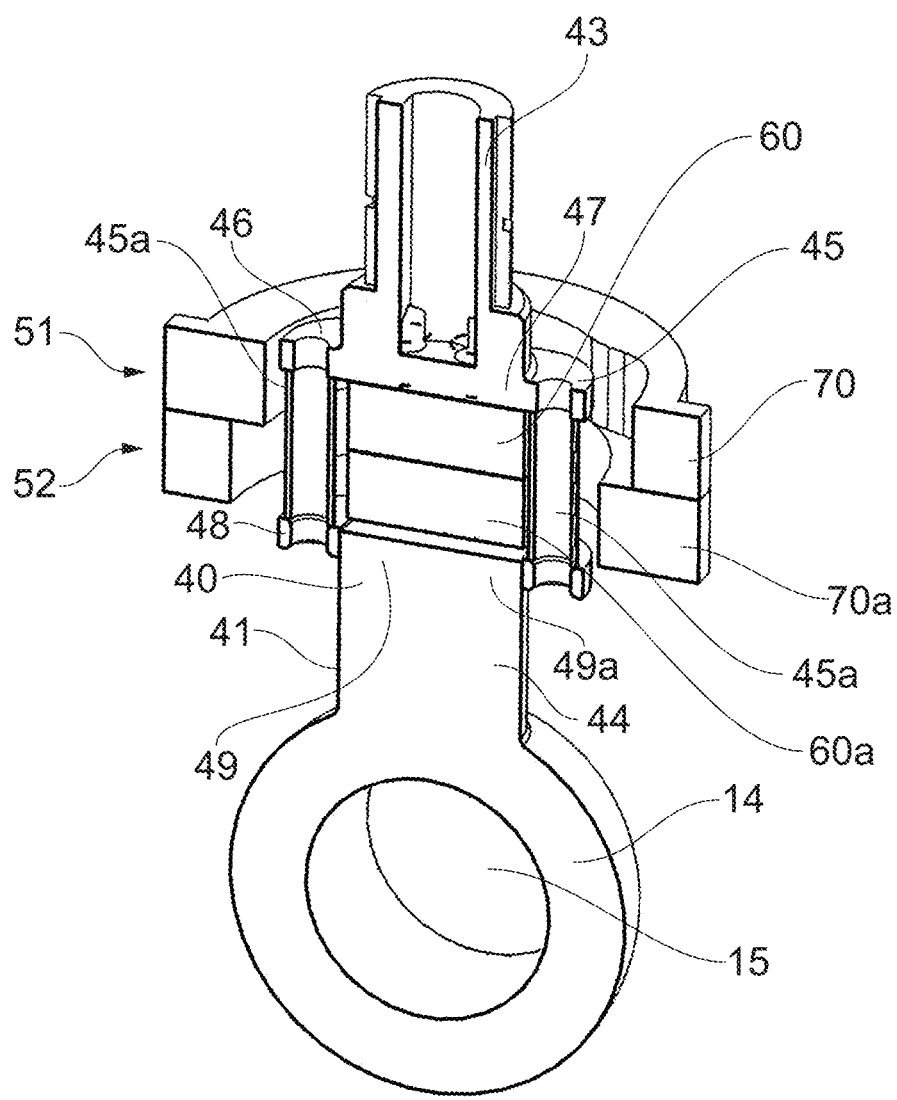
FIG. 6 is a cross-sectional schematic view of the sensor assembly of the valve assembly shown in FIG. 5.
Figure 7:
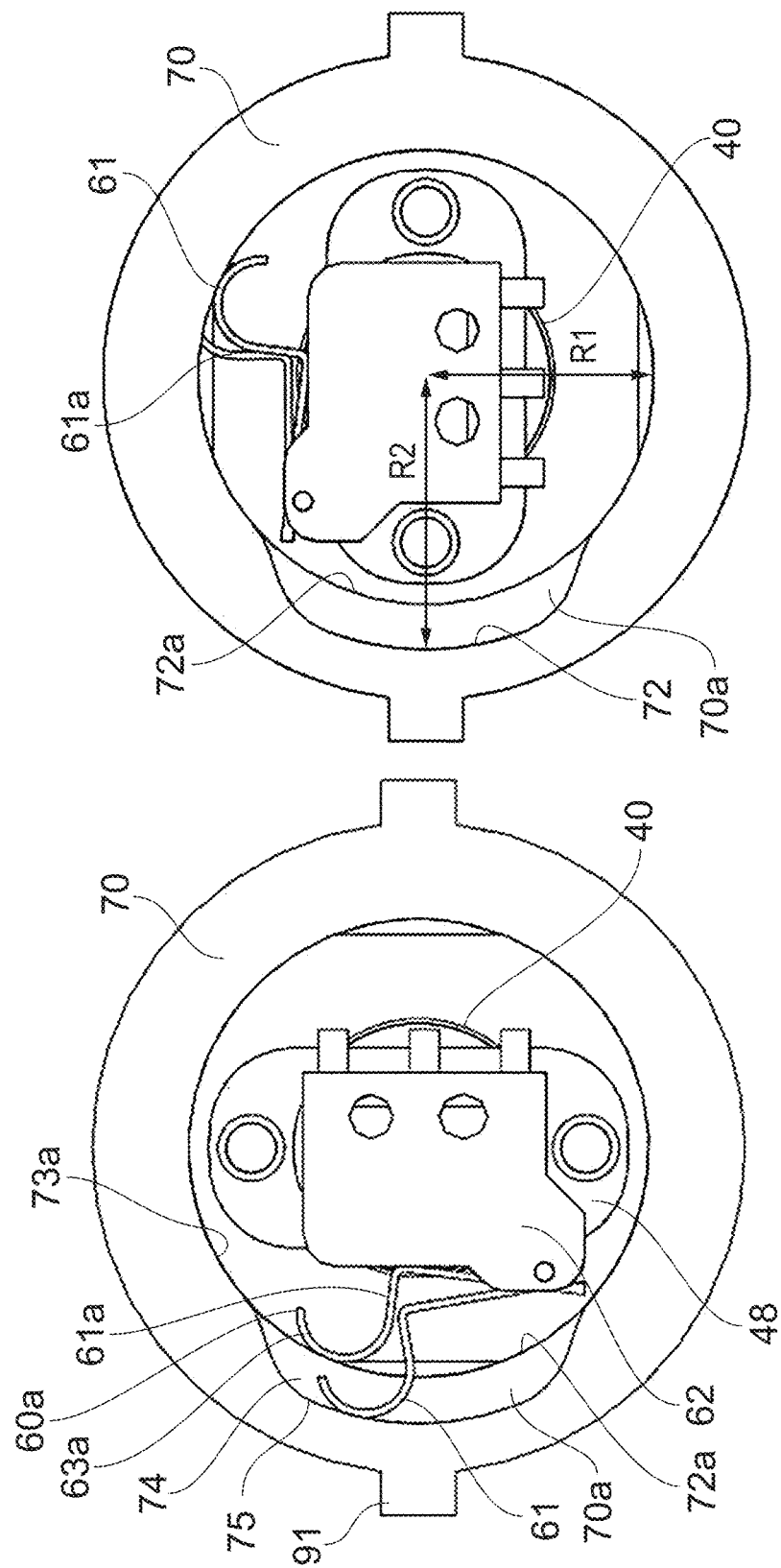
FIG. 7A is a cross-sectional schematic top view of the sensor assembly in a first position.
FIG. 7B is a cross-sectional schematic top view of the sensor assembly in a second position.

Referring to FIGS. 4 and 6, the first and second valve shaft portions 43, 44 are spaced by a spacer arrangement 45. Two spacers 45a are shown in the figures, although the number of spacers may differ. The spacers 45a are a plurality of rods connecting the valve shaft portions 43, 44. The first and second position sensors 60, 60a are received between the spacers 45a. In embodiments, the spacer arrangement 45 is integrally formed with one or both shaft portions 43, 44. A connecting flange 46 is provided at a sensor end 47 of the first shaft portion 43. A connecting plate 48 is provided at an opposing sensor end 49 of the second shaft portion 44. The connecting plate 48 is mounted at the opposing sensor end 49 by a mount 49a. The connecting plate 48 may be integrally formed. The spacers 45a extend between the connecting flange 46 and connecting plate 48. This arrangement helps provide spacing in the shaft for the sensors.

With reference to FIGS. 4, 7A and 7B, a key arrangement 90 mounts the first and second indicators 70, 70a in the housing. The key arrangement 90 comprises keys 91 and corresponding keyways 92. Each of the first and second indicators 70, 70a has a pair of keys 91. The number of keys 91 may differ and may be a single key. The corresponding keyways 92 are formed in the housing 20 to receive the keys 91. Each keyway 92 is an axially extending channel 93 formed in the wall of the housing 20. The first and second indicators 70, 70a are configured to slide fit in the housing 20. The first and second indicators 70, 70a are configured to slide from an open end of the housing 20 when the housing 20 is disassembled. The keys 91 are configured to travel axially along the channel 92 so that the first indicator 70 can be located in the housing 20. A shoulder 94 is located to limit movement of the first and second indicators 70, 70a. The shoulder 94 is configured to axially locate the first and second indicators 70, 70a. The shoulder 94 is positioned at one end of the keyway 92. The first indicator 70 abuts against the shoulder 94. The second indicator 70a abuts against the first indicator 70. In embodiments, a spacer may be used to space the first and second indicators 70, 71. The key arrangement 90 locates the first and second indicators 70, 70a and prevents rotation in the housing.

The transfer arrangement 80 will now be described in detail with reference to FIG. 4. The first transfer module 81 is in the first chamber of the housing 21. The first transfer 81 module is on the valve shaft 40. The first transfer module 81 rotates with the valve shaft 40. The first transfer module 81 is a disc. The first transfer module 81 is disposed on the valve shaft 40. The valve shaft 40 extends through the first transfer module 81. The second transfer module 82 is in the second chamber 22 of the housing 20. The second transfer module 82 is stationary with respect to valve shaft 40. The second transfer module 82 is fixed on the housing 20. The second transfer module 82 is a disc. The first transfer module 81 and the second transfer module 82 are separated by the barrier 23. The transfer modules 81, 82 may be spaced axially. In other embodiments, the first transfer module 81 and the second transfer module 82 can be any shape.

The first transfer module 81 comprises a printed circuit board (PCB). The first transfer module 81 comprises a power receiving module. The first transfer module 81 is configured to transfer electrical power to the sensor assembly 50. A connector 100 communicates the first transfer module 81 with the first and second position sensors 60, 60a. The first transfer module 81 has a receiver 83 for receiving wireless electrical power. The receiver 83 is an induction coil. The first transfer module 81 has a converter 84 for converting wireless electrical power into a useful form for the sensor assembly 50. For example, the first transfer module 81 has a converter, inverter, rectifier or the like for converting the wirelessly transmitted electrical power into a form that can be used by the position sensors 60, 60a. The second transfer module 82 is a power transmitting module. The second transfer module has a receiver 83a for receiving electrical power from a power source 110. The second transfer module 82 has a converter 84a. The converter 84a is configured to convert the electrical power into a form that can be wirelessly transmitted. The second transfer module 82 has a transmitter 85. The transmitter 85 is configured to transmit electrical power. The transmitter 85 is an induction coil. The electrical power is transmitted by electromagnetic induction. The receiver 83 of the first transfer module 81 is configured to receive electrical power from the transmitter 85 of the second transfer module 82. In other embodiments, the wireless power transfer means can be a different power transfer means.

In embodiments, the first and second transfer modules are printed circuit boards (PCB). The components of the first and second transfer modules are produced from a copper layer of a PCB. For example, the induction coil is shaped from a copper layer of a PCB. In other embodiments the first and second transfer modules are formed by different means. In other embodiments the components of the first and second transfer modules are produced by different means, for example, a transmitter may be a short range antenna.

The first transfer module 81 comprises a wireless data transmitting module. The first transfer module 81 is configured to receive data/signals from the position sensors 60, 60a. The first transfer module 81 has a signal receiver 86. The signal receiver 86 is configured to receive signals from the sensor assembly 50. The first transfer module 81 has a signal transmitter 87. The signal transmitter 87 is configured to transmit the signals received by the signal receiver 86. The second transfer module 82 comprises a wireless data receiving module. The second transfer module 82 comprises a signal receiver 86a. The signal receiver 86a of the second transfer module 82 is configured to receive signals from the signal transmitter 87 of the first transfer module 81. In some embodiments, at least one of the first transfer module 81 and/or the second module 82 comprises an induction coil. In some embodiments the second transfer module includes a signal transmitter 87a. The signal transmitter 87a of the second transfer module 82 is configured to transmit the signals received by the signal receiver 86a of the second transfer module 82. The signal transmitter 87a of the second transfer module 82 may be configured to communicate with a controller 89 in some embodiments.

A controller 89 is operable to control the first transfer module 81 and the second transfer module 82. The controller 89 may be on one or both of the first transfer module 81 and the second transfer module 82, or may be separate. The controller 89 comprises a processor 89a and a memory 89b. The controller 89 is configured to determine the position of the valve shaft 40 in dependence on signals received from the first and second position sensors 60, 60a.

In embodiments, the first transfer module 81 and the second transfer module 82 may comprise any component that may be configured for wireless power transmission and/or wireless data transmission between the first transfer module 81 and the second module 82.

With combined reference to FIG. 7A and FIG. 7B operation of the sensor assembly 50 will now be described in detail.

The valve shaft 40 is located in the housing 20. The valve shaft 40 rotates about the rotational axis. The rotation of the valve shaft 40 is driven by the motor 16. Rotation of the valve shaft 40 rotates the valve head 14. Rotating the valve head 14 changes the operating condition of the valve assembly 10. The motor 16 is operated to rotate the valve shaft 40 in the housing 20. Initially the first and second contact elements 61, 61a lie in contact with the respective first and second cam 71, 71a surfaces in a first position. In this first position the first contact element 61 is in contact with the second surface section 75 of the first indicator 70. That is the first contact element 61 is in the recess 74. The first contact element 61 is biased into the extended position as determined by the second radial distance R2. The first contact element 61 is therefore actuated and a signal is transmitted to the controller 89. The first contact element 61 therefore positively detects that the shaft 40, and therefore the valve head 14, is in a first operating condition, for example a closed flow condition. The second contact element 61a is in contact with the first surface section 73a of the second indicator 70a. The second contact element 61a is biased into the retracted position as determined by the first radial distance R1. The second contact element 61a is therefore not actuated.

As the valve shaft 40 is rotated, the first and second position sensors 60, 60a rotate with the valve shaft 40. The first contact element 61 slides along the internal surface 72 of the cam 71 as the valve shaft 40 rotates, and so slides arcuately along the second surface section 75. The second contact element 61a slides along the internal surface 72a of the second cam 71a, and so slides arcuately along the first surface section 73a of the second indicator 70a. As further rotation of the valve shaft 40 occurs, the first position sensor 60 is rotated such that the contact element 61 moves into contact with the transition portion 76 and then into contact with the first surface section 73. The first contact element 61 is biased into the retracted position as determined by the first radial distance R1. The first contact element 61 is therefore not actuated. The second position sensor 60a is rotated such that the contact element 61a moves into contact with the transition portion 76a and then into contact with the second surface section 75a. The second contact element 61a is biased into the extended position as determined by the second radial distance R2.

The second contact element 61a is therefore actuated and a signal is transmitted to the controller 89. The second contact element 61a therefore positively detects that the shaft 40, and therefore the valve head 14, is in a second operating condition, for example an open flow condition. By providing a position sensor on the shaft, it is possible to maximize the circumferential length of the indicator. The number of positions that can be detected can be increased. That is to say the number of surface sections of the indicator can be increased. The length of the surface sections are not limited, and can be increased or decreased as required. Increasing the cam length helps to provide a reliable sensor assembly. It is also possible to easily replace the indicators. In some embodiments, the contact element 61 is spaced from the first indicator 70 at various positions of the valve shaft 40. In such an embodiment the contact element 61 is not of adequate length to extend the annular gap between the valve shaft 40 and the second surface section 75 of the first indicator 70.

Interaction between the contact element 61 of the first position sensor 60 and the second surface section 75 of the first indicator 70 indicates a first position of the valve shaft 40. Interaction between the contact element 61 of the first position sensor 60 and the first surface section 73 of the first indicator 70 indicates a second position of the valve shaft 40.

Interaction between the contact element 61 of the first position sensor 60 and the transition portion 76 of the first indicator 70 occurs when the valve shaft 40 rotates from the first position to the second position. The contact element 61 transitions from the first position of the contact element 61 to the second position of the contact element 61. Disposing the indicator 70 on the housing 20 helps reduce the stress on the contact element 61 when the valve shaft 40 is rotating to a different position. The length of the transition portion 76 of the cam can be increased, and less steep/sharp. This helps reduce the wear on the contact element and may help decrease the need for maintenance. The operational life of the contact element 61 would be improved.

In other embodiments, the process of position detection of the second position sensor 60a can be different from the first position sensor 60. In the present embodiment, the first position sensor 60 and the second position sensor 60a are each microswitches acting as contact sensors. In various embodiments, the first position sensor 60 and/or the second position sensor 60a may be a proximity ultrasonic sensor, hall sensor, IR proximity reflective sensor or any other sensor capable of detecting the indicator 70.

Figure 8:
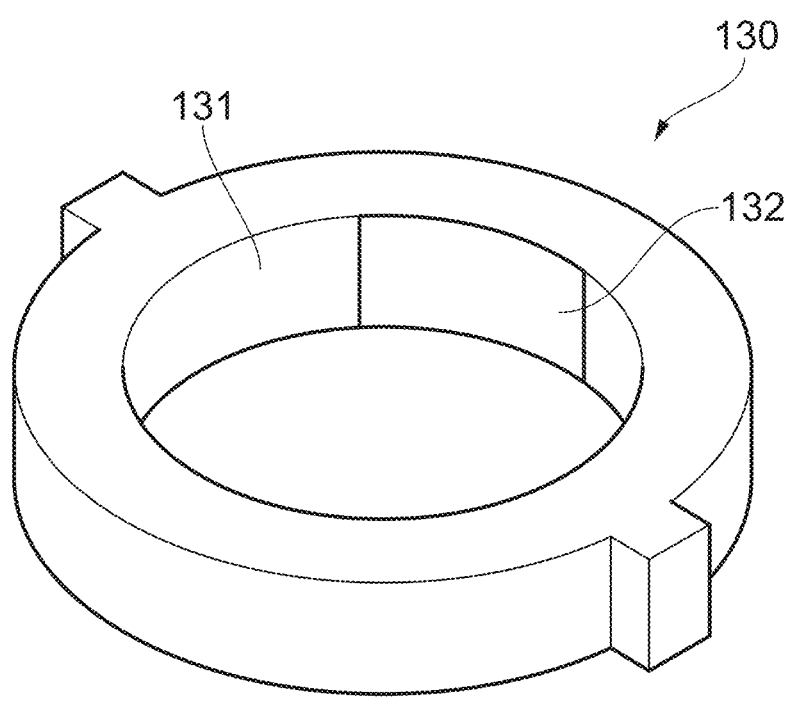
FIG. 8 is a schematic view of an indicator according to various embodiments.
Figure 9B:
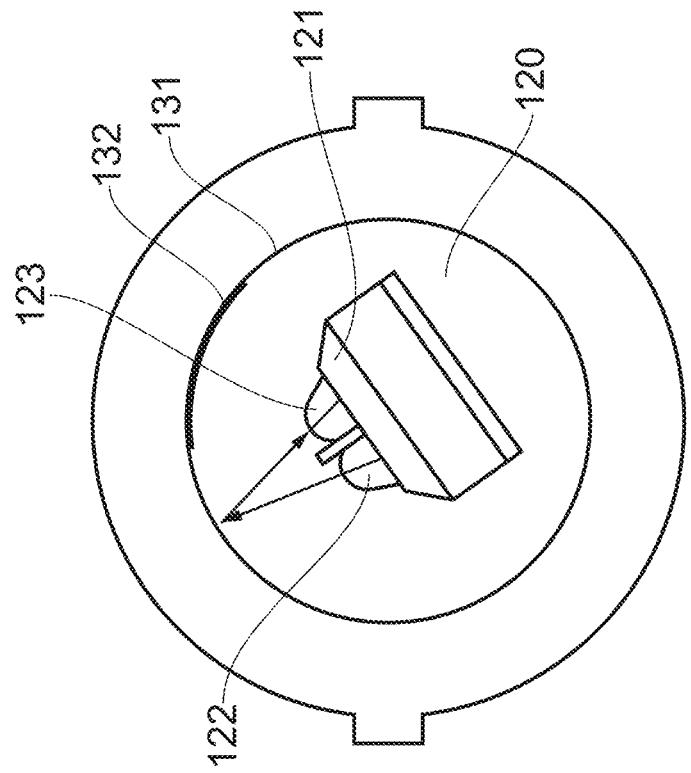
FIG. 9B is a cross-sectional top view of a non-contact embodiment of the sensor assembly in a second position.
Figure 9A:
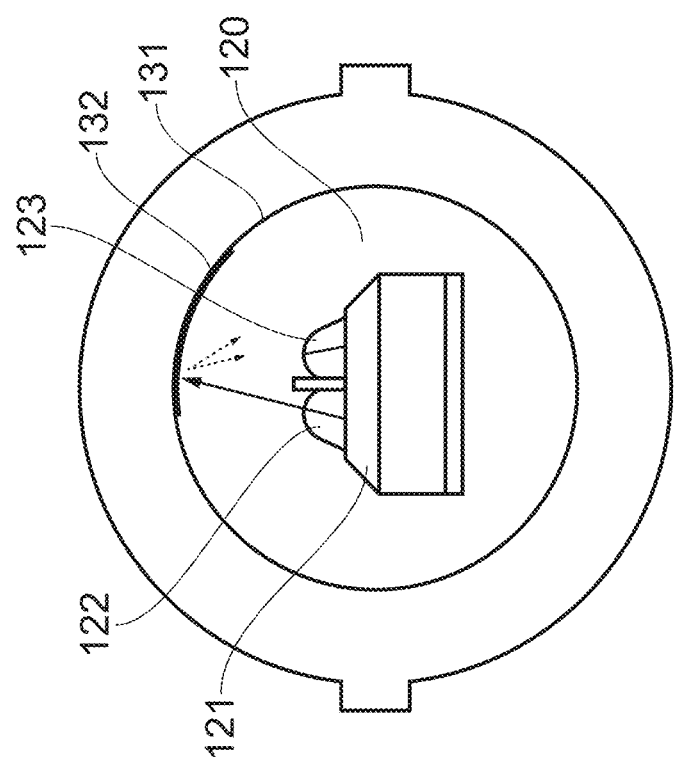
FIG. 9A is a cross-sectional top view of a non-contact embodiment of the sensor assembly in a first position.

An embodiment of the sensor configuration will now be described in detail with reference to FIGS. 8, 9A and 9B. In this embodiment, the hydraulic valve assembly including the valve arrangement, the drive arrangement and the monitoring arrangement is substantially the same as described above. However, in this embodiment the sensor assembly 50 differs.

In this embodiment, the position sensor is a non-contact sensor. The non-contact sensor in the present embodiment is an optical sensor 120. The optical sensor 120 is arranged with the shaft as described above, however the position sensor acts in a non-contact configuration with a corresponding indicator 130. The optical sensor 120 has an optical detection device 121. The optical detection device 121 has an optical transmitter 122 and an optical receiver 123.

The transmitter 122 is configured to emit electromagnetic radiation. The transmitter 122 is aligned to emit in the radial direction. The transmitter 122 is configured to transmit pulses of electromagnetic radiation. In some embodiments, the transmitter 122 continuously transmits electromagnetic radiation. In various embodiments the direction that radiation is emitted by the transmitter, the waveform of emitted radiation and the wavelength of emitted radiation are different and are not limited to the described embodiment. The receiver 123 is configured to detect electromagnetic radiation from the environment. The receiver 123 is configured to convert the detected electromagnetic radiation into an electrical signal. The electrical signal is indicative of the detected electromagnetic radiation. In embodiments the receiver 123 is configured to detect intensity of the electromagnetic radiation. In embodiments, the transmitter 122 and the receiver 123 are combined as a transceiver.

In embodiments wherein the position sensor 120 is an optical sensor, the indicator 130 associated with the position sensor 120 may have substantially the same arrangement as described above. However, the indicator 130 in the present arrangement has an inner surface having a constant radius around the circumference of the indicator 130. The indicator 130 in this embodiment comprises a first surface section 131 of the inner surface has reflective properties. The first surface section 131 is configured to reflect electromagnetic radiation impinging on the first surface section 131. In embodiments the first surface section 131 is configured to reflect a greater proportion of electromagnetic radiation of a particular wavelength range than the second surface section 132. The second surface section 132 of the indicator 130 has non-reflective or reduced reflective properties. The second surface section 132 is configured to absorb electromagnetic radiation impinging on the second surface section 132. In embodiments the second surface section 132 is configured to absorb a greater proportion of electromagnetic radiation of a particular wavelength range than the first surface section 132.

The reflective and non-reflective properties of the first and second surface section 131, 132 are configured to reflect and absorb electromagnetic radiation in the same wavelength range. In embodiments, the first and second surface sections 131, 132 are configured to have high reflectance and absorption respectively for electromagnetic waves of approximately the same wavelength that the optical detection device 121 is configured to detect. In embodiments, the first and second surface sections 131, 132 have reflecting and absorbing coatings respectively that provide the first and second surface sections 131, 132 with reflecting and absorbing properties. It can be appreciated that the reflection and absorption properties of the first and second surface sections 131, 132 can be a result of any attribute of the indicator 130, for example the materials or the surface structure. In the shown embodiment, the inner surface of the indicator 130 is a ring. However the inner surface of the indicator 130 can be any shape.

In an embodiment wherein the radius of the inner surface of the indicator varies, similar to the cam described in previous embodiments, the optical sensor may instead or also detect the proximity of the indicator.

In an embodiment, the first position sensor comprises an IR proximity reflective sensor. In this embodiment, the reflective coating is configured to reflect infra-red light. In the present embodiment, the position sensor is configured to detect the proximity of the indicator 70 to the valve shaft 40. The operation of such a non-contact position sensor would be similar to that of the contact sensor already described. The surface sections of the indicator are disposed at different radial distances from the valve shaft. The position sensor is configured to identify the surface section being detected. The position sensor is configured to compare the detected proximity of the surface section of the indicator with known distances of the different surface sections of the first indicator.

In other embodiments, the or each position sensor is a proximity ultrasonic sensor, hall sensor, or any other type of sensor configured to detect a position of the valve shaft. Each position sensor may be the same type of position sensor, or the type of position sensor may differ.

The circumferential length of the surface sections of the indicators can be adjusted to adjust the accuracy of position detection. The accuracy of position detection of a position of the valve shaft can be adjusted by increasing or decreasing the circumferential length of the corresponding surface section of the indicator. The accuracy of the sensor assembly can be adjusted by replacing the original indicators with new indicators. The sensor assembly 50 is therefore flexible and can be configured for different operating requirements without the need to redesign or replace the entire sensor assembly. Increasing the length of a surface section of the indicator decreases the accuracy of detecting the corresponding position of the valve shaft (vice versa if the length is decreased). This has the potential benefit of reducing the impact of systematic errors in position detection (e.g. calibration errors).

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the claims. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

The invention claimed is:

1. A valve assembly comprising:
a housing;
a valve shaft rotatable in the housing; and
a sensor assembly for detecting the position of the valve shaft;
wherein the sensor assembly comprises:
an indicator on the housing; and
a position sensor inside the housing and on the valve shaft configured to detect a feature of the indicator to determine the position of the valve shaft;
wherein the indicator comprises a cam.

2. The valve assembly of claim 1, wherein the position sensor comprises a contact sensor.

3. The valve assembly of claim 1, wherein the position sensor comprises at least one of an ultrasonic sensor, a hall sensor, and an IR proximity reflective sensor.

4. The valve assembly of claim 3, wherein the indicator comprises at least a first surface section and a second surface section, the position sensor on the valve shaft being configured to remotely detect the difference between the first surface section and a second surface section to determine the position of the valve shaft.

5. A valve assembly comprising:
a housing;
a valve shaft rotatable in the housing; and
a sensor assembly for detecting the position of the valve shaft;
wherein the sensor assembly comprises:
an indicator on the housing; and
a position sensor on the valve shaft configured to detect a feature of the indicator to determine the position of the valve shaft,
wherein the position sensor is a first position sensor, and the sensor assembly comprises a second position sensor.

6. The valve assembly of claim 5, wherein the indicator comprises a first indicator part and a second indicator part, wherein the first position sensor is configured to detect the first indicator part and the second position sensor is configured to detect the second indicator part.

7. The valve assembly of claim 5, comprising a transfer arrangement configured to transfer at least one of power and a communication signal, comprising a first transfer module rotatable with the valve shaft, and a second transfer module on the housing wherein the first and second transfer modules communicate to transfer the at least one of power and a communication signal.

8. The valve assembly of claim 7, wherein the first transfer module comprises a wireless power receiving module, and the second transfer module comprises a wireless power transmitting module; and/or wherein the first transfer module comprises a wireless data receiving module, and the second transfer module comprises a wireless data transmitting module.

* * * * *